US007475359B2

(12) United States Patent  
Hudson, Jr.

(10) Patent No.: US 7,475,359 B2
(45) Date of Patent: Jan. 6, 2009

(54) USER INTERFACE FOR A TABBED PANE

(75) Inventor: Thomas R. Hudson, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 11/350,421

(22) Filed: Feb. 9, 2006

(65) Prior Publication Data

US 2007/0186175 A1 Aug. 9, 2007

(51) Int. Cl.
*G06F 9/00* (2006.01)
*G06F 3/048* (2006.01)

(52) U.S. Cl. .................. 715/777; 715/764; 715/776; 715/784; 715/802; 715/804; 715/810; 715/835; 715/864

(58) Field of Classification Search ................ 715/777, 715/776, 784, 810, 864, 767, 802, 804, 835; 345/169, 173
See application file for complete search history.

(56) References Cited

U.S. PATENT DOCUMENTS

| | | | |
|---|---|---|---|
| 5,550,969 A | 8/1996 | Torres et al. | |
| 5,572,644 A | 11/1996 | Liaw et al. | |
| 5,867,729 A | 2/1999 | Swonk | |
| 6,097,391 A * | 8/2000 | Wilcox | 715/776 |
| 6,433,797 B1 | 8/2002 | Zellweger | |
| 6,433,801 B1 | 8/2002 | Moon et al. | |
| 6,691,138 B1 | 2/2004 | Kirkpatrick et al. | |
| 6,734,883 B1 * | 5/2004 | Wynn et al. | 715/830 |
| 6,738,787 B2 * | 5/2004 | Stead | 707/104.1 |
| 6,741,268 B1 | 5/2004 | Hayakawa | |
| 6,778,192 B2 | 8/2004 | Arbab et al. | |
| 7,249,325 B1 * | 7/2007 | Donaldson | 715/777 |
| 2004/0135811 A1 | 7/2004 | Pickering et al. | |

OTHER PUBLICATIONS

RD 310044, Feb. 20, 1990.
IBM Research Disclosure No. 42499, "Interface Providing for 4-Way Scrolling Using a Single Scrollbar in Graphical User Interface", Aug. 1999.
Fitzpatrick et al., IBM Technical Disclosure Bulletin, "User Interface to Multi-Valued Graphical Notebook Tabs", vol. 36, No. 8, pp. 649-653, Aug. 1993.
Fitzpatrick et al., IBM Technical Disclosure Bulletin, "Notebook Control Cascading Tab Choices", vol. 35, No. 4B, pp. 284-286, Sep. 1992.
Martinez, Technical Disclosure Bulletin, "Scrolling Tab Feature for a Notebook Control", vol. 39, No. 7, pp. 73-74, Jul. 1996.
Brininstool et al., IBM Technical Disclosure Bulletin, "Graphical Notebook Control Tab Scroll Button Action Settings", vol. 35, No. 4B, Sep. 1992.

* cited by examiner

*Primary Examiner*—Doug Hutton
*Assistant Examiner*—Elizabeth G Wright
(74) *Attorney, Agent, or Firm*—Martin J. McKinley; Hoffman Warnick LLC

(57) ABSTRACT

The present invention provides a user interface for a tabbed pane. A method in accordance with an embodiment of the present invention includes: displaying a plurality of ordered tabs in a tab folder; selecting one of the tabs; scrolling through the plurality of tabs; and docking the selected tab within the tab folder if the scrolling will cause the selected tab to disappear from the tab folder.

3 Claims, 8 Drawing Sheets

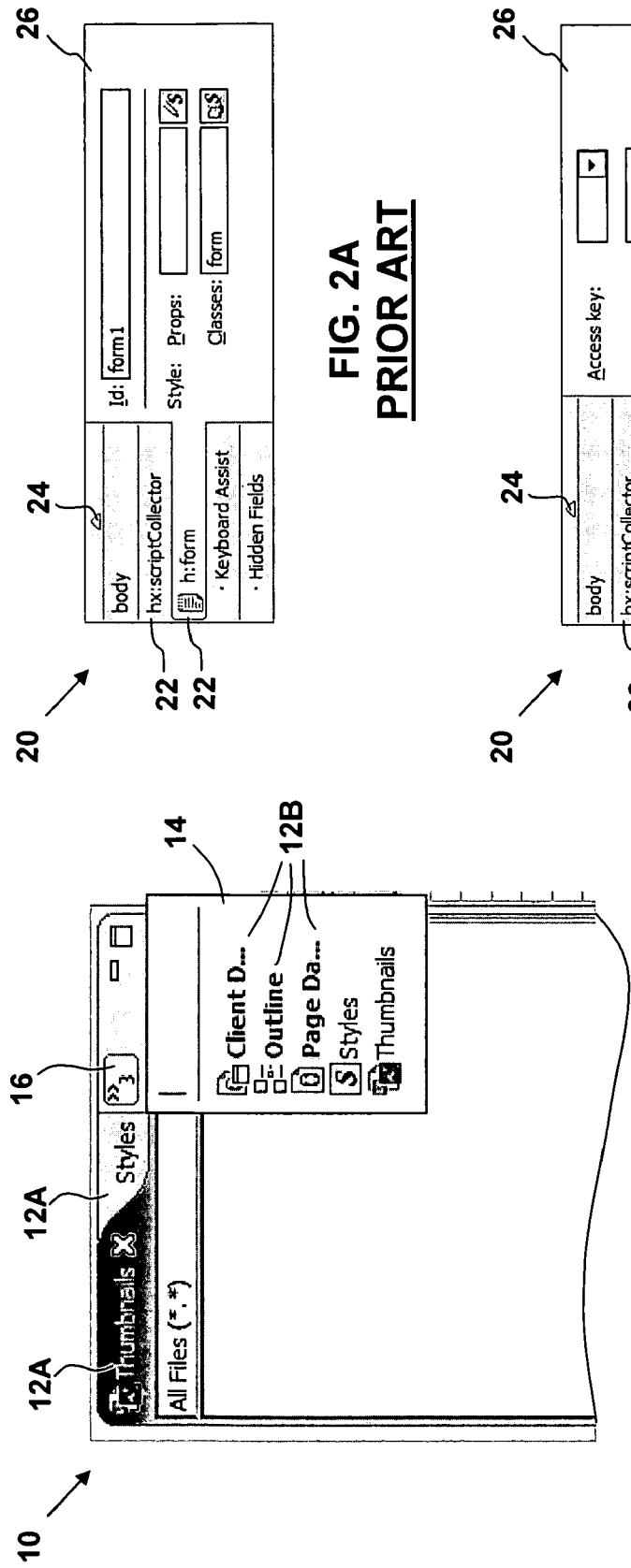

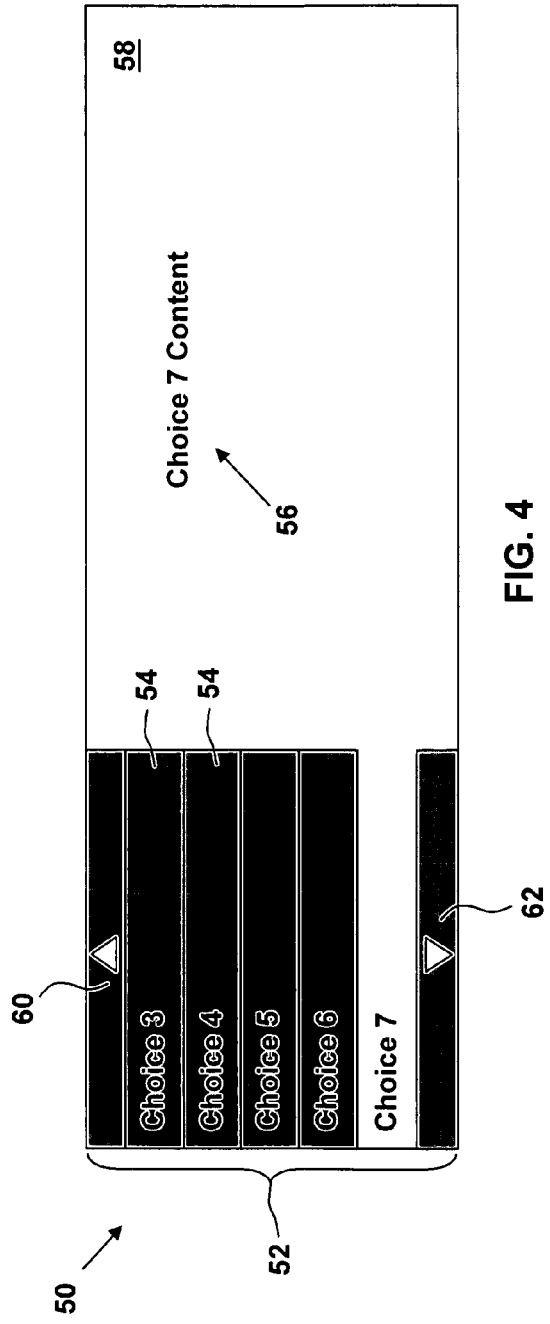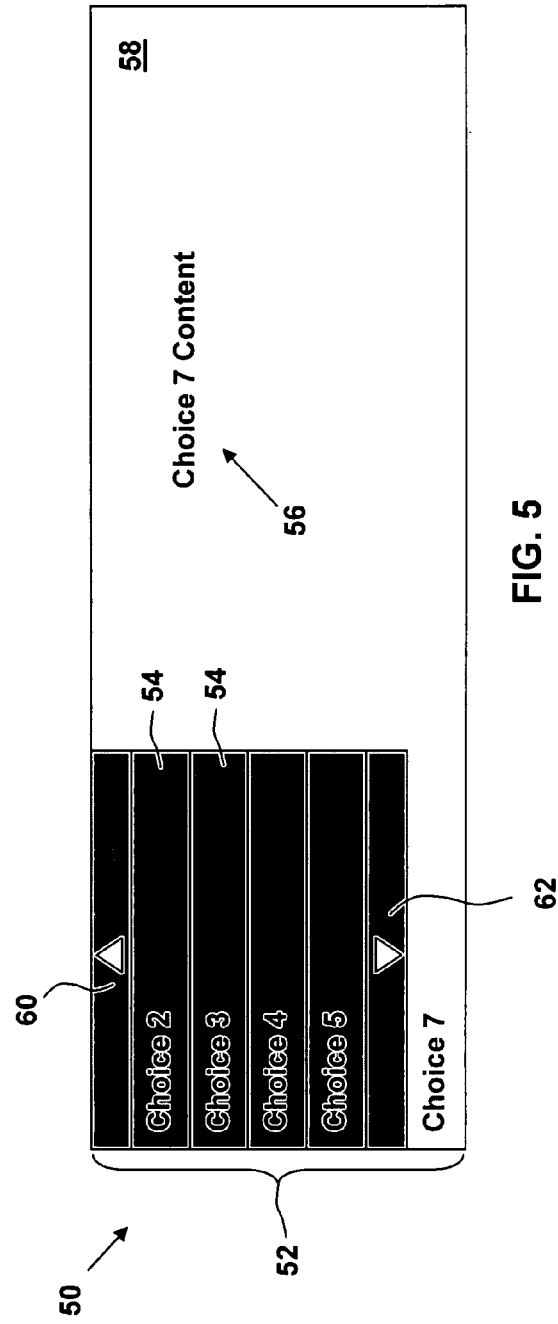

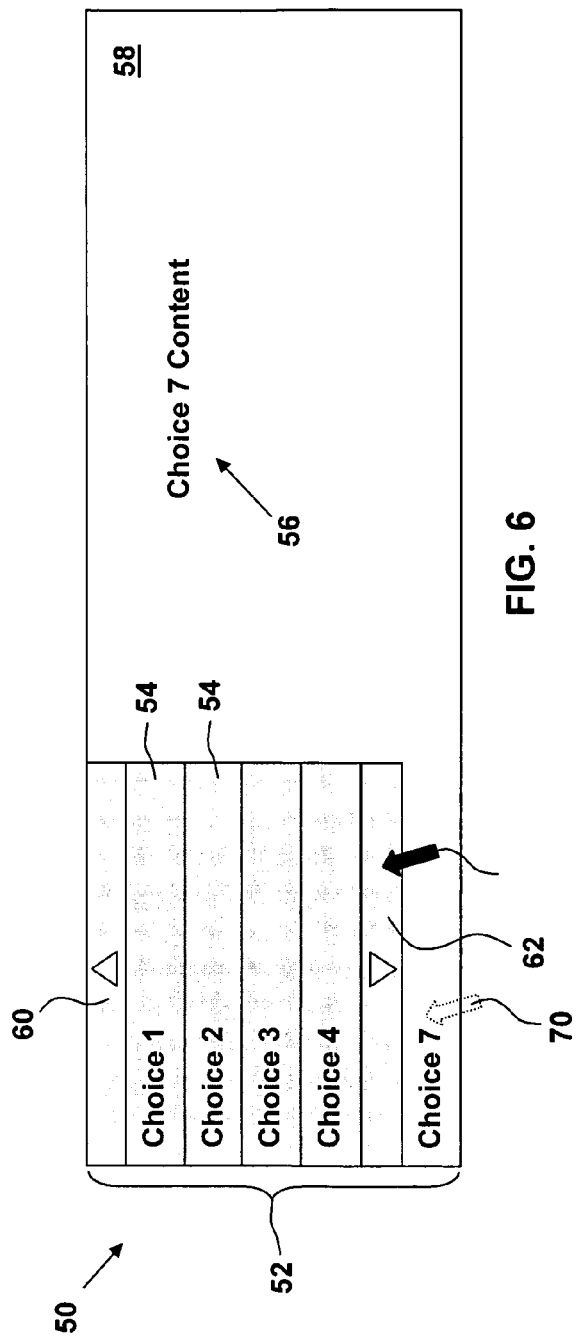
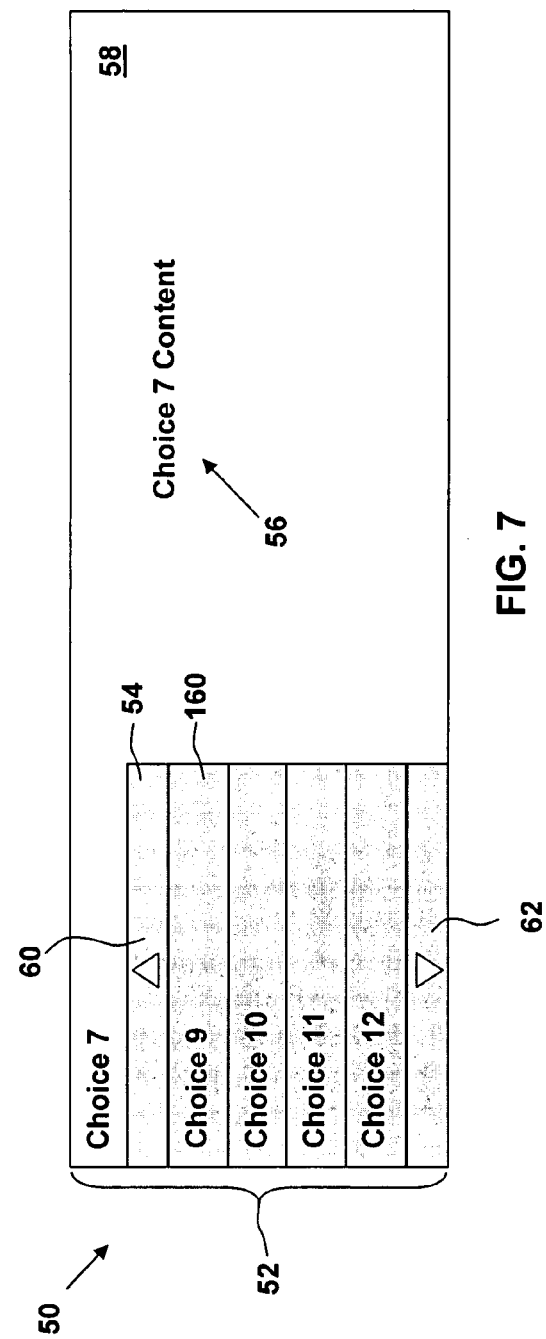

USER INTERFACE FOR A TABBED PANE

BACKGROUND OF THE INVENTION

1. Field of the Invention

The present invention generally relates to user interfaces, and more specifically relates to a user interface for a tabbed pane.

2. Related Art

In a tabbed pane user interface (UI), multiple pages of content, each associated with a particular tab, are stacked on top of each other in some manner. When a tab associated with a page is selected, the content of that page is displayed, while the content of other pages is hidden from view. Typically, the order of the tabs has important meaning or aids significantly in navigation.

A first example of a tabbed pane UI 10 is illustrated in FIG. 1. In the tabbed pane UI 10, only a few tabs 12A are displayed, while other tabs 12B not currently visible can be selected and displayed via a popup window 14. The existence of additional tabs 12B and the number of such tabs 12B are indicated by the symbol ">>" and number (e.g., "3"), respectively, present on the actuation button 16 of the popup window 14. This approach is not very familiar to many users, and the use/meaning of the symbol ">>" and the number (e.g., "3") on the actuation button 16 of the popup window 14 is not intuitive. Further, when the popup window 14 is not visible, there is no indication as to whether the additional tabs 12B precede or follow the tabs 12A currently visible. In some implementations of the tabbed pane UI 10, the tabs 12A, B are not maintained in any order.

Another example of a tabbed pane UI 20 is illustrated in FIGS. 2A and 2B. In the tabbed pane UI 20, a plurality of tabs 22 are displayed, while other tabs 22 are hidden from view. As shown, the tabs 22 are arranged vertically within the tabbed pane UI 20. However, in other configurations, the tabs 22 can be arranged horizontally. One or more scroll buttons 24 are used to scroll among the tabs 22. The scroll buttons 24 can be located at opposite sides of the tabbed pane UI 20 (only one is shown) or on the same side of the tabbed pane UI 20. The content 26 of a page associated with a selected tab 22 (i.e., "h:form" in FIG. 2A) is displayed adjacent the tabs 22. Unfortunately, depending on how far a user scrolls through the tabs 22, it may not be possible to visually determine which tab 22 is currently selected. This scenario is illustrated in FIG. 2B, where the content 26 of a page associated with a selected tab 22 is displayed, but the selected tab 22 itself has disappeared from view.

A further example of a tabbed pane UI 30 is illustrated in FIG. 3. In the tabbed pane UI 30, a plurality of rows 32 of tabs 34 are provided. When a tab 34 is selected, the content 36 of the page associated with the selected tab 34 is displayed. This type of tabbed pane UI 30 takes up a large amount of screen real estate, especially when screen real estate is at a premium (e.g., on smaller displays). Further, the tabs 34 are not provided in a fixed location. For example, when a tab 34 is selected from the top row 32, the top row 32 moves to the bottom, the content 36 of the selected tab 34 is displayed, and the other rows 32 resort. This makes it difficult to keep track of and locate a desired tab 34 in the tabbed pane UI 30. Importantly, the tab order is not preserved, which is unacceptable for some applications.

In view of the foregoing, there is a need in the art for an improved tabbed pane UI.

SUMMARY OF THE INVENTION

The present invention provides a tabbed pane user interface (UI).

A first aspect of the present invention is directed to a method for providing a tabbed pane user interface, comprising: displaying a plurality of ordered tabs in a tab folder; selecting one of the tabs; scrolling through the plurality of tabs; and docking the selected tab within the tab folder if the scrolling will cause the selected tab to disappear from the tab folder.

A second aspect of the present invention is directed to a system for providing a tabbed pane user interface, comprising: a system for displaying a plurality of ordered tabs in a tab folder; a system for selecting one of the tabs; a system for scrolling through the plurality of tabs; and a system for docking the selected tab within the tab folder if the scrolling will cause the selected tab to disappear from the tab folder.

A third aspect of the present invention is directed to a program product stored on a tangible medium for providing a tabbed pane user interface, the tangible medium comprising program code for performing the steps of: displaying a plurality of ordered tabs in a tab folder; selecting one of the tabs; scrolling through the plurality of tabs; and docking the selected tab within the tab folder if the scrolling will cause the selected tab to disappear from the tab folder.

A fourth aspect of the present invention is directed to a method for deploying an application for providing a tabbed pane user interface, comprising: providing a computer infrastructure being operable to: display a plurality of ordered tabs in a tab folder; select one of the tabs; scroll through the plurality of tabs; and dock the selected tab within the tab folder if the scrolling will cause the selected tab to disappear from the tab folder.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which:

FIG. 1 depicts a first type of tabbed pane UI in accordance with the prior art.

FIG. 2 depicts a second type of tabbed pane UI in accordance with the prior art.

FIGS. 4-8 depict an illustrative tabbed pane UI in accordance with an embodiment of the present invention.

Figure 3:
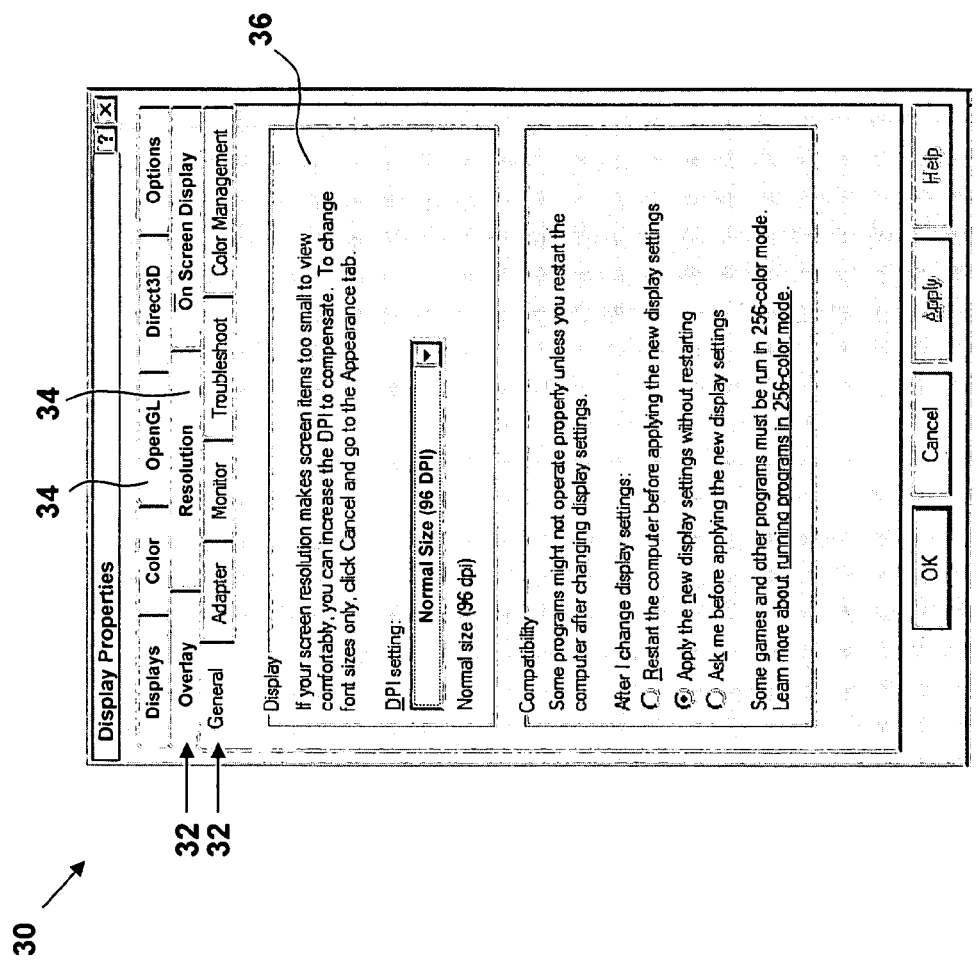
FIG. 3 depicts a third type of tabbed pane UI in accordance with the prior art.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

A tabbed pane UI 50 in accordance with an embodiment of the present invention is depicted in FIG. 4. The tabbed pane UI 50 includes a container, such as a tab folder 52, in which a plurality of tabs 54 are displayed in a particular order (i.e., the tabs 54 are ordered). As shown, the tabs 54 are arranged vertically within the tabbed pane UI 50. However, in other configurations, the tabs 54 can be arranged horizontally within the tabbed pane UI. In FIG. 4, for example, the tabs 54 "Choice 3," "Choice 4," "Choice 5," "Choice 6," and "Choice 7" are displayed in the tab folder 52. Additional tabs 54 "Choice 2," and "Choice 1" exist above tab 54 "Choice 3," but are not currently displayed due to space constraints. Similarly, additional tabs 54 "Choice 8," "Choice 9," "Choice 10," "Choice 11," and "Choice 12" exist below tab 54 "Choice 7," but are not displayed due to space constraints. The tab 54 "Choice 7" is currently selected and the content 56 of the page associated with the selected tab 54 "Choice 7" is displayed in an area 58 adjacent to the tab folder 52. A scroll up button 60 and a scroll down button 62 are provided to allow a user to scroll up and down through the tabs 54, respectively. In a configuration in which the tabs 54 are arranged horizontally within the tabbed pane UI, scroll left and a scroll right buttons are provided.

The tabbed pane UI 50 in accordance with the present invention is configured to display the selected tab 54 and the content 56 thereof at all times. This contrasts with the tabbed pane UI 20 depicted in FIGS. 2A and 2B in which the selected tab 22 could disappear when a user scrolls through the tabs 22.

FIG. 5 illustrates the tabbed pane UI 50 of the present invention after a user has actuated the scroll up button 60 to scroll up to the tab 54 "Choice 2." As shown, instead of disappearing from view, the selected tab 54 "Choice 7" has been "docked" at the bottom edge of the tab folder 52. In addition, the tab 54 "Choice 6" has disappeared from view and the scroll down button 62 has been relocated to appear directly above the docked, selected tab 54 "Choice 7." To this extent, the scroll down button 62 now visually separates the docked, selected tab 54 "Choice 7" from the tab 54 "Choice 5," thereby indicating that at least one intervening tab 54 (i.e., tab 54 "Choice 6" in this example) is hidden from view. That is, the position of the scroll down button 62 indicates both that tab 54 "Choice 7" has been selected, and is displayed out of its normal position. In general, docking at the bottom edge of the tab folder 52 indicates that the selected tab 54 comes after the tabs 54 currently displayed in the tab folder 52.

Figure 12:
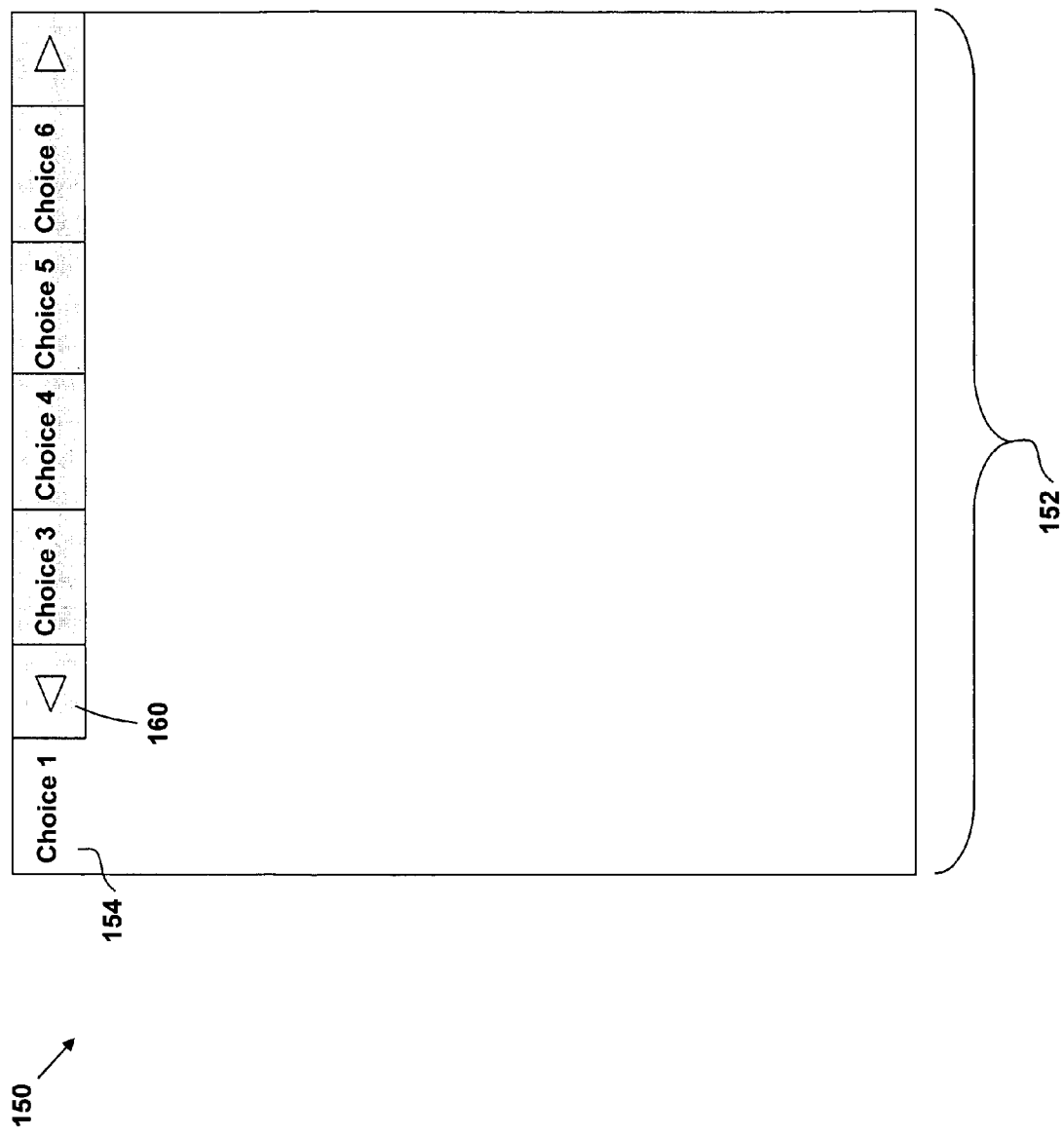
FIG. 12 depicts another illustrative tabbed pane UI in accordance with an embodiment of the present invention.

FIG. 12 depicts an analogous situation for a tabbed UI pane 150 in which the tabs 154 are arranged horizontally within the tab folder 152. In this case, the selected tab 154 "Choice 1" has been "docked" at the left edge of the tab folder 152 and the scroll left button 160 has been relocated to appear directly to the left of the docked, selected tab 154 "Choice 1."

The above process can be animated to be more intuitive to the user (the analogous process described below can also be animated). For example, the following animation sequence could be used:

1. The tab 54 "Choice 6" disappears;
2. The tabs 54 "Choice 3," "Choice 4," and "Choice 5" slide down;
3. The tab 54 "Choice 2" appears above the tab 54 "Choice 3";
4. The selected tab 54 "Choice 7" slides down slightly and is docked; and
5. The scroll down button 62 slides up above the selected tab 54 "Choice 7."

Many other animation methodologies could also be used.

If the user actuates the scroll up button 60 again in order to scroll up to tab 54 "Choice 1," then the tabbed pane UI 50 will appear as illustrated in FIG. 6. As shown, the selected tab 54 "Choice 7" remains docked at the bottom edge of the tab folder 52, the tab 54 "Choice 1" has appeared, and the tabs 54 "Choice 5" and "Choice 6" have both disappeared from view.

If the scroll down button 62 is actuated, given the state of the tabbed pane UI 50 depicted in FIG. 6, the tabbed pane UI 50 will then return to the state shown in FIG. 5. If the scroll down button 62 is then actuated a second time, the tabbed pane UI 50 will return to the state shown in FIG. 4. In this case, since the selected tab 54 "Choice 7" can be displayed normally (i.e., not docked and in its correct order), the scroll down button 62 will relocate itself at the bottom of the tab folder 52, below the selected tab 54 "Choice 7."

FIG. 7 illustrates the tabbed pane UI 50 of FIG. 4 after a user has repeatedly actuated the scroll down button 62 to scroll down to the tab 54 "Choice 12." As shown, instead of disappearing from view, the selected tab 54 "Choice 7" has been "docked" at the top edge of the tab folder 52. In addition, the tab 54 "Choice 8" has disappeared from view and the scroll up button 60 has been relocated to appear directly below the docked, selected tab 54 "Choice 7." To this extent, the scroll up button 60 now visually separates the docked, selected tab 54 "Choice 7" from the tab 54 "Choice 9," thereby indicating that at least one intervening tab 54 (i.e., tab 54 "Choice 8" in this example) is hidden from view. That is, the position of the scroll up button 60 indicates both that tab 54 "Choice 7" has been selected, and is displayed out of its normal position. In general, docking at the top edge of the tab folder 52 indicates that the selected tab 54 precedes the tabs 54 currently displayed in the tab folder 52.

Figure 8:
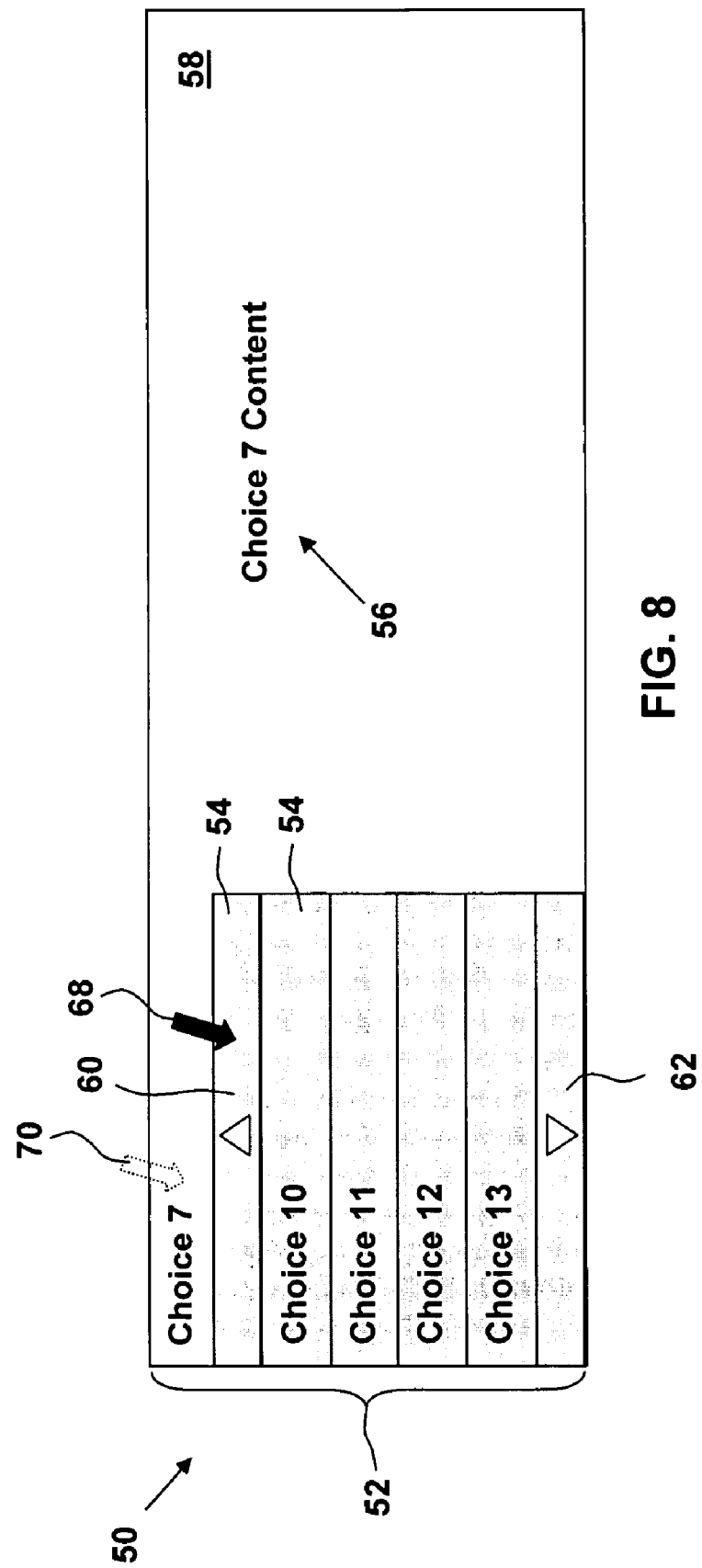

If the user actuates the scroll down button 62 again in order to scroll down to tab 54 "Choice 13," then the tabbed pane UI 50 will appear as illustrated in FIG. 8. As shown, the selected tab 54 "Choice 7" remains docked at the top edge of the tab folder 52, the tab 54 "Choice 13" has appeared, and the tabs 54 "Choice 8" and "Choice 9" have both disappeared from view.

If the scroll up button 60 is actuated, given the state of the tabbed pane UI 50 depicted in FIG. 8, then the tabbed pane UI 50 will return to the state shown in FIG. 7. If the scroll up button 60 is then actuated a second time, the selected tab 54 "Choice 7" will be displayed normally (i.e., not docked) and the scroll up button 60 will relocate itself at the top of the tab folder 52, above the selected tab 54 "Choice 7."

In some cases, the relocation of the scroll up button 60 when actuated could be confusing or frustrating to the user. To address this concern, the tabbed pane UI 50 of the present invention can be configured such that the scroll up button 60 remains fixed in place after actuation as long as a mouse pointer 68 (see, e.g., FIGS. 6 and 8) (or other selection mechanism) is positioned thereover. Only when the mouse pointer 68 is removed from over the scroll up button 60 will the scroll up button 60 relocate itself. The same can apply to a relocation of the scroll down button 62. As a further solution, the tabbed pane UI 50 can be configured such that a reselection of the selected tab 54, when docked, causes the tabs 54 to scroll back in the correct direction until the selected tab 54 can be displayed normally (i.e., not docked). Such a reselection is represented by the phantom mouse pointer 70 shown, for example, in FIGS. 6 and 8. As such, a user can repeatedly click on the same location in the tabbed pane UI 50, first on the docked, selected tab 54, then on the scroll up or scroll down button 60, 62 that reappears in that location.

Figure 10:
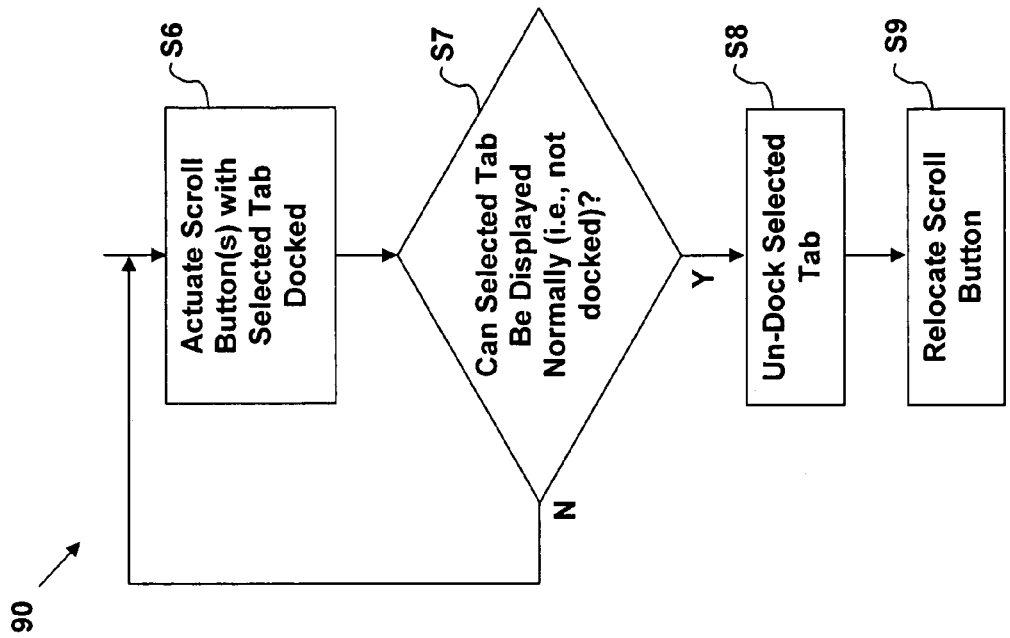
FIG. 10 depicts a flow diagram of a method in accordance with an embodiment of the present invention.
Figure 9:
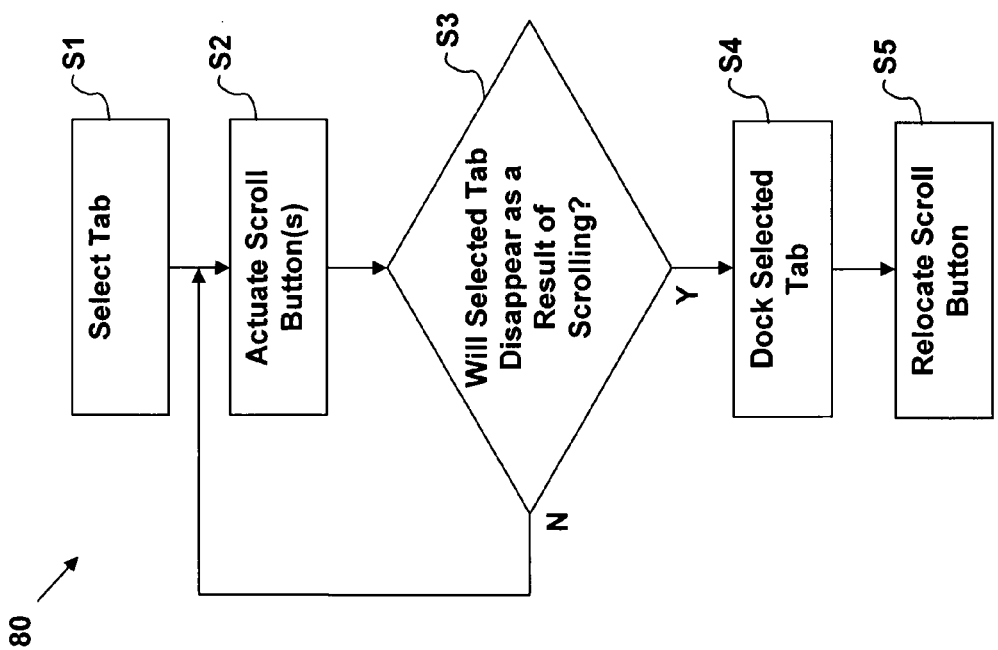
FIG. 9 depicts a flow diagram of a method in accordance with an embodiment of the present invention.

A first flow diagram 80 of a method in accordance with an embodiment of the present invention is depicted in FIG. 9. A second flow diagram 90 of a method in accordance with an embodiment of the present invention is depicted in FIG. 10. The steps of the flow diagrams 80, 90 will be described in conjunction with the elements of the tabbed pane UI 50 illustrated in FIGS. 4-8.

In step S1 (flow diagram 80), a user selects a tab 54 displayed in the tab folder 52 of the tabbed pane UI 50. In step S2, the user actuates the up and/or down scroll buttons 60, 62 to display a particular tab 54. In step S3, if it is determined that the selected tab 54 will disappear from the top or bottom of the tab folder 52 as a result of the scrolling, then in step S4 the selected tab 54 is docked at the top or bottom edge, respectively, of the tab folder 52. Next, in step S5, the up scroll button 60 is relocated below the docked, selected tab 54 (if the selected tab 54 is docked at the top edge of the tab folder 52) or the down scroll button 62 is relocated above the docked, selected tab 54 (if the selected tab 54 is docked at the bottom edge of the tab folder 52).

In step S6 (flow diagram 90), the user actuates the up and/or down scroll buttons 60, 62 to display a particular tab 54 while a selected tab 54 is docked. In step S7, if it is determined that the selected tab 54 can be displayed normally in the tab folder 52 (i.e., not docked) then in step S8 the selected tab 54 is un-docked and displayed normally. In step S9, depending on whether the selected tab 54 was docked at the top or bottom of the tab folder 52, the up or down scroll button 60, 62, respectively, is relocated to the top or bottom, respectively, of the tab folder 52.

Figure 11:
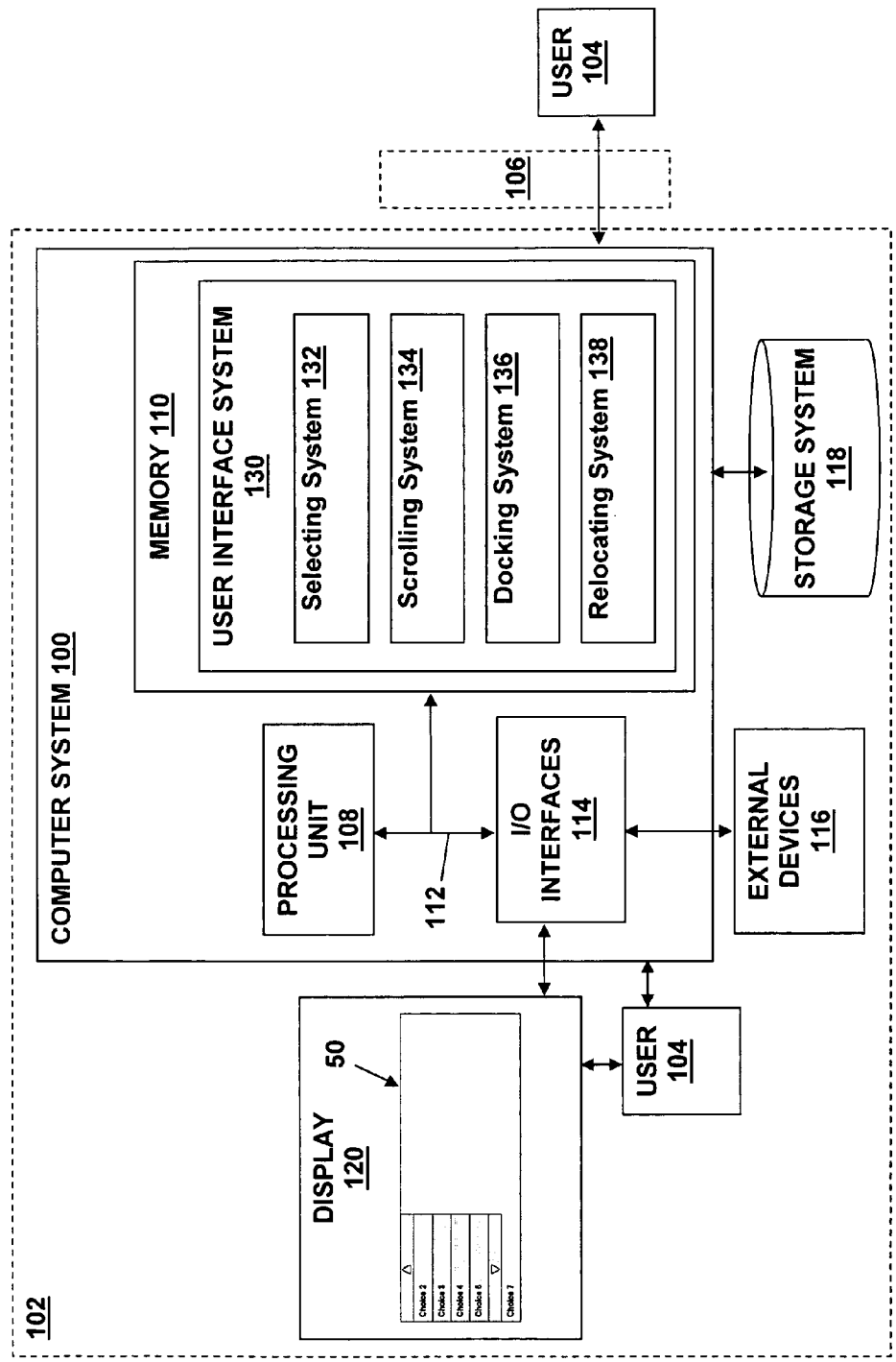
FIG. 11 depicts an illustrative computer system for implementing embodiment(s) of the present invention.

A computer system 100 for providing a tabbed pane UI 50 in accordance with an embodiment of the present invention is depicted in FIG. 11. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a tabbed pane UI in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/0) interfaces 114. Further, computer system 100 is shown in communication with external devices/resources 116 and one or more storage systems 118. In general, processing unit 108 executes computer program code, such as user interface system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 11 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a user interface system 130 for providing a tabbed pane UI 50 in accordance with embodiments of the present invention. The user interface system 130 includes a selecting system 132 for selecting a tab in a tab folder, a scrolling system 134 for scrolling through the tabs in the tab folder (e.g., using up and down scrolling buttons), a docking system 136 for docking a selected tab if the scrolling causes the selected tab to disappear from the tab folder (and for undocking the selected tab when the selected tab can be displayed normally), and a relocating system 138 for relocating a scrolling button based on the docking position of the selected tab.

The present invention can be offered as a business method on a subscription or fee basis. For example, one or more components of the present invention can be created, maintained, supported, and/or deployed by a service provider that offers the functions described herein for customers. That is, a service provider can be used to provide a service for providing a tabbed pane UI, as described above.

It should also be understood that the present invention can be realized in hardware, software, or any combination thereof. Any kind of computer/server system(s) —or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or tangible medium providing program code for use by or in connection with a computer or any instruction execution system. For the purposes of this description, a computer-usable or tangible medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a tangible medium include a semiconductor or solid state memory, magnetic tape, removable computer diskette, random access memory (RAM), read-only memory (ROM), rigid magnetic disk and optical disk. Current examples of optical disks include a compact disk —read only disk (CD-ROM), a compact disk—read/write disk (CD-R/W), and a digital versatile disk (DVD).

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for providing a tabbed pane user interface, comprising:
    displaying a plurality of ordered tabs in a tab folder;
    selecting one of the tabs;
    scrolling through the plurality of tabs using a scroll button;
    determining if the selected tab will disappear as a result of the scrolling;
    docking the selected tab within the tab folder if the scrolling will cause the selected tab to disappear from the tab folder, wherein a content of the selected tab is always displayed;
    in a first case, relocating the scroll button to a first side of the selected tab if the selected tab is docked at a first position within the tab folder, wherein the scroll button is sandwiched between the selected tab and a plurality of other tabs in the tab folder, and wherein at least one intervening tab, between the selected tab and the plurality of other tabs in the tab folder, disappears from view such that the displayed tabs are no longer displayed in order;
    in a second case, relocating the scroll button to a second side of the selected tab if the selected tab is docked at a second position within the tab folder, wherein the scroll button is sandwiched between the selected tab and a plurality of other tabs in the tab folder, and wherein at least one intervening tab, between the selected tab and the plurality of other tabs in the tab folder, disappears from view such that the displayed tabs are no longer displayed in order;
    un-docking the selected tab in response to additional scrolling if the selected tab can be displayed in its normal order in the tab folder;
    relocating the scroll button to its original position within the tab folder and displaying the tabs in order in the tab window.

2. The method of claim 1, wherein the docking step further comprises:
    docking the selected tab at an edge of the tab folder.

3. The method of claim 1, wherein the scroll button is selected from the group consisting of a scroll button for scrolling through the plurality of tabs in a first direction and a scroll button for scrolling through the plurality of tabs in a second, opposite direction.

* * * * *